UNITED STATES PATENT OFFICE.

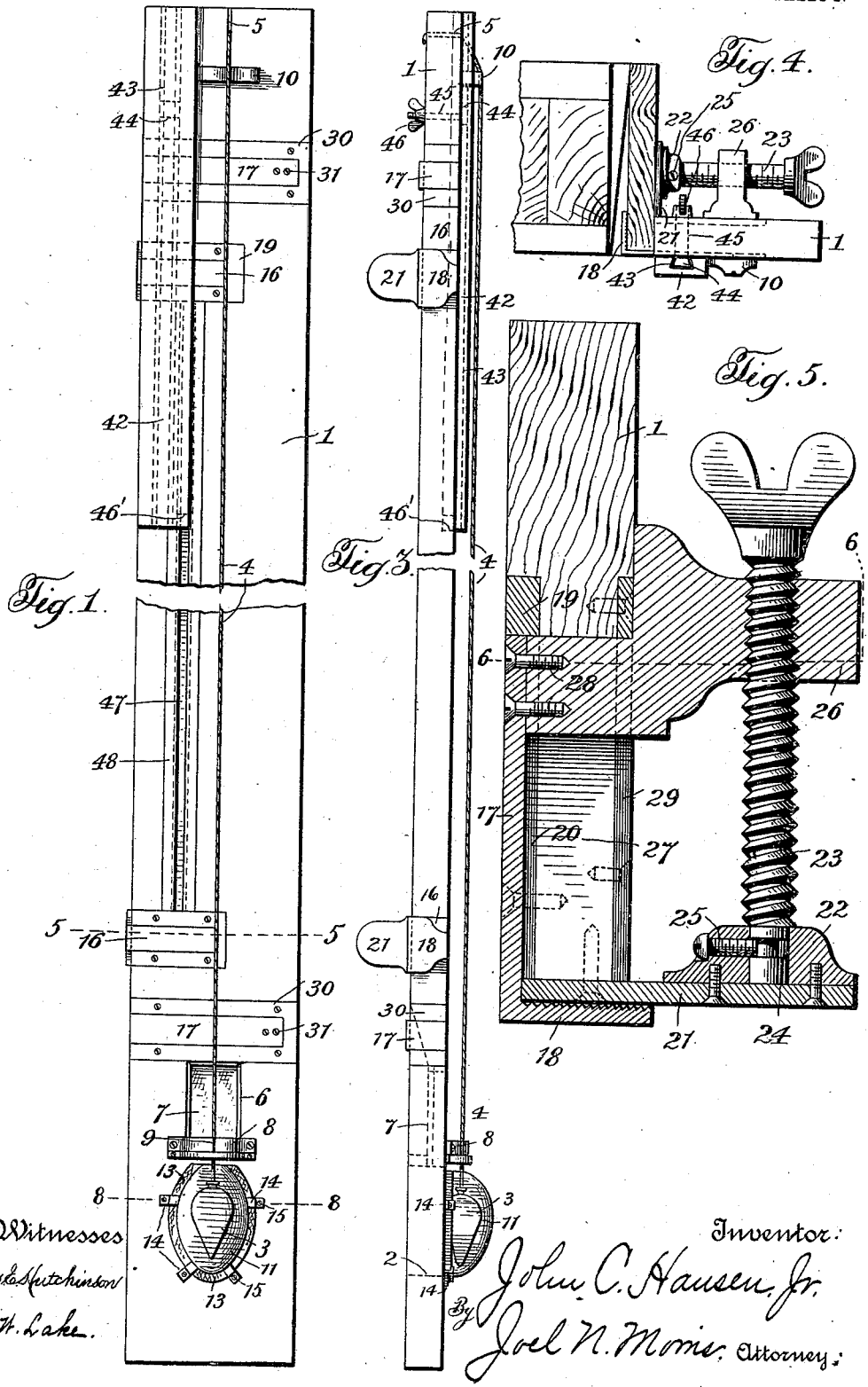

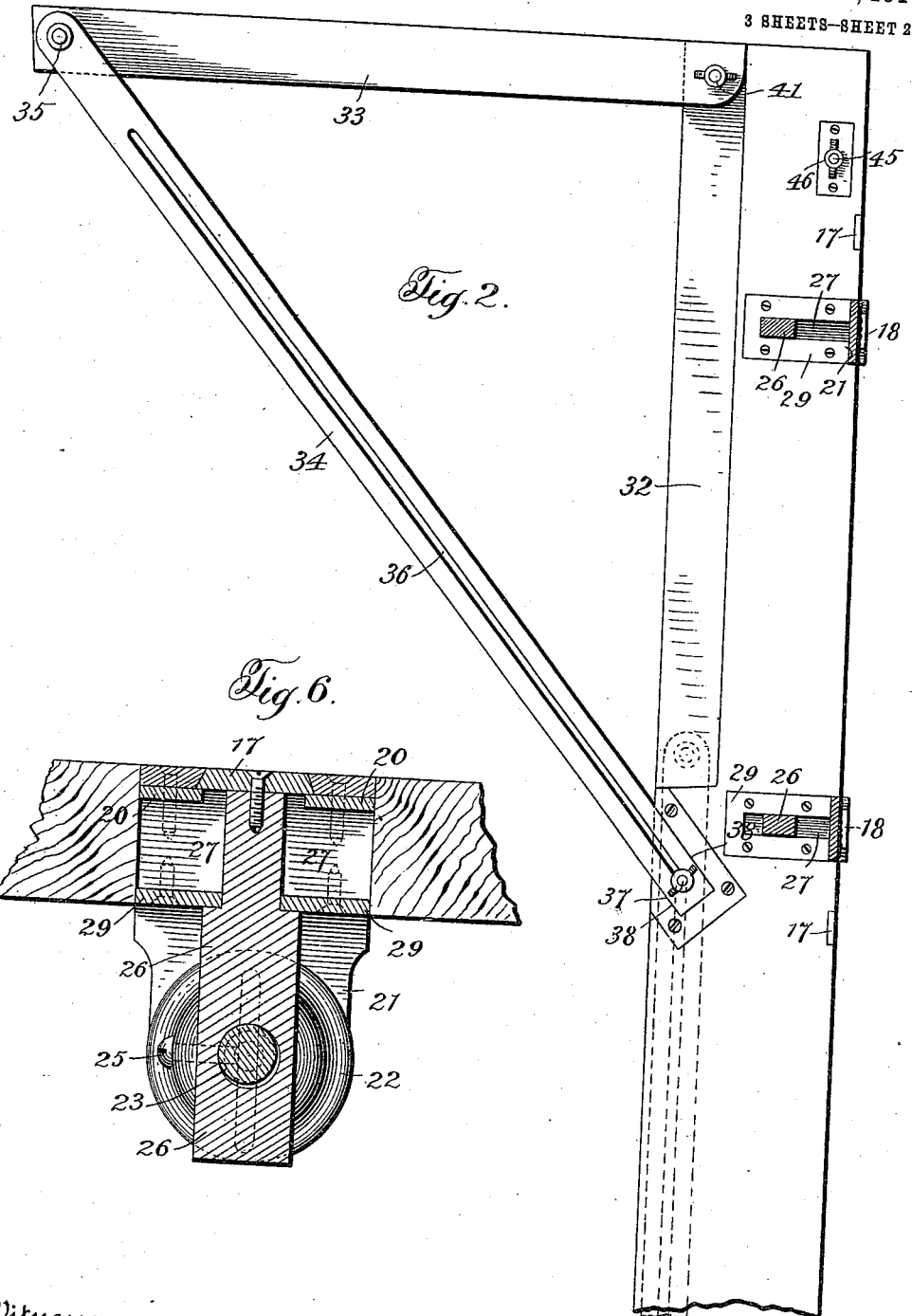

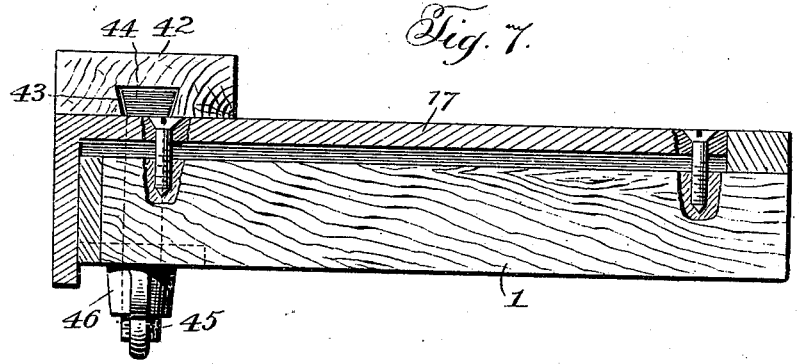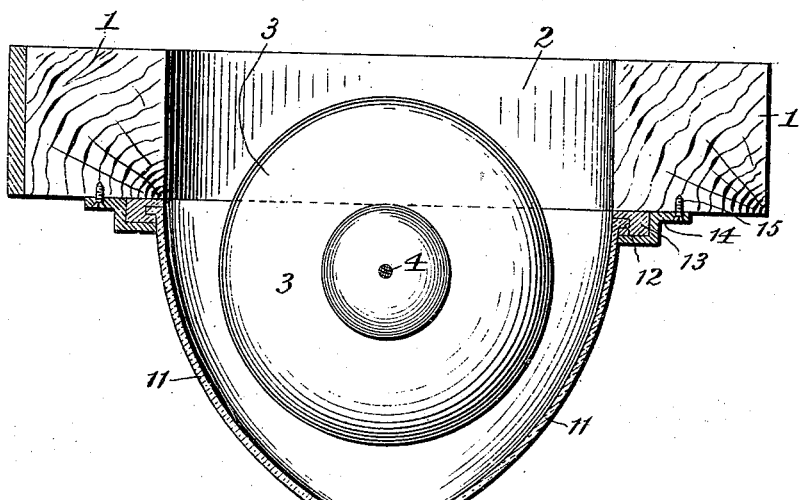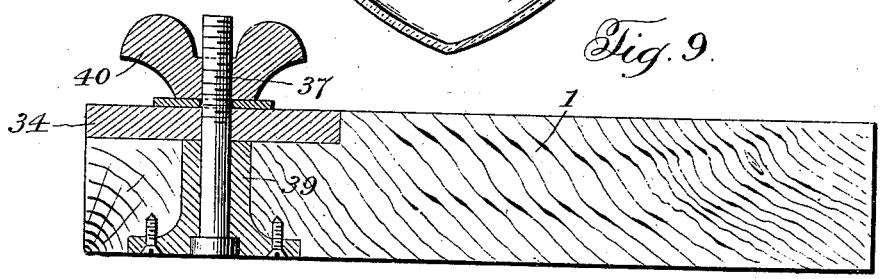

JOHN C. HANSEN, JR., OF NEWARK, NEW JERSEY.

PLUMB-LEVEL.

977,735.  Specification of Letters Patent.  Patented Dec. 6, 1910.

Application filed February 13, 1909. Serial No. 477,608.

*To all whom it may concern:*

Be it known that I, JOHN C. HANSEN, Jr., citizen of the United States, residing at Newark, in the county of Essex and State of New Jersey, have invented certain new and useful Improvements in Plumb-Levels; and I do hereby declare the following to be a full, clear, and exact description of the invention, such as will enable others skilled in the art to which it appertains to make and use the same.

This invention relates to improvements in plumb levels, and it has for its object to provide an implement of this character especially designed for use in setting the jambs of doors although the instrument is susceptible of general use as a plumb level.

In setting door jambs, much difficulty is experienced by reason of the fact that in determining the correctness of the setting the leveling devices must be frequently applied to the jambs for repeated observations, and much time is accordingly required for application of the leveling devices.

The present invention, however, aims to provide a plumb level having provision for temporarily fixing the same to the door jamb, thus enabling the level to remain upon the jamb during the setting of the latter, and thereby permitting the mechanic to determine at a glance the position of the jamb.

The invention further aims to provide in a plumb level of the character described simple and efficient means, whereby the angular relation of the transverse member of the frame, whether this be the head jamb or the transom rail, may be readily determined while the level is applied to the side jamb.

With these general objects in view, the invention consists substantially in the novel construction, combination and arrangement of parts hereinafter fully described, illustrated in the accompanying drawings, and pointed out in the appended claims.

While the form of the invention herein shown and described is believed to be a preferable embodiment thereof, it is perfectly obvious that the invention is susceptible of various changes in the form, proportion and minor details of construction, and the right is accordingly reserved to modify or vary the invention as falls within the scope of the same.

In the drawings, Figure 1 is a front elevation of a plumb level constructed in accordance with and embodying the principles of the present invention. Fig. 2 is a rear view thereof, the gage arm for determining the proper position of the transverse frame member, whether the latter be the head jamb or the transom rail, being in open position. Fig. 3 is an edge elevation. Fig. 4 is a top plan view. Fig. 5 is a transverse sectional view on the line 5—5, Fig. 1. Fig. 6 is a similar view on the line 6—6, Fig. 5. Fig. 7 is also a transverse sectional view through the supplemental clamping member and its retaining guide. Fig. 8 is a similar view, on an enlarged scale, on the line 8—8, Fig. 1. Fig. 9 is a transverse sectional view taken through the clamping screw of the supporting arm employed in connection with the gage arm.

Referring in detail to the drawing, the numeral 1 designates the stock of the hereindescribed plumb level. This stock may be formed of any suitable material, and the same is provided at a point adjacent to its lower end with an opening 2 for receiving the usual plumb-bob 3 suspended by a cord 4 from the top end of the stock 1. At the latter point the cord is received by a groove 5, and suitably fastened to said stock. At a point above the opening 2 is arranged a sight opening 6 in which is placed a pane of glass 7, and immediately in front of said opening 6 is arranged a transversely disposed indicator bar 8 at the central portion of which, and at both faces, are arranged vertically extending guide lines 9. The purpose of these lines is to indicate when the plumb-bob hangs in a perfectly vertical position, the cord 4 registering with the lines 9 when in such position. This cord, that the same may be properly spaced from the stock 1, is seated in a vertically grooved block 10 that is carried by the stock 1 at its front face, and adjacent to its upper end. Therefore, the cord is spaced from the stock 1, and consequently the cord may freely vibrate with the groove of the block 10 to restrain the vibration of the upper end of said cord. By reason of applying the guide lines 9 at both faces of the indicator bar 8, it will be apparent that the vertical position of the cord may be readily determined from the rear face of the stock 1, the glass 7 exposing the line and its relation to the inner face of the bar 8 at that face of the stock.

At the front face of the stock 1, and covering the opening 2, is a casing 11 that is formed of celluloid, or other suitable material that is of a transparent character, the edge of this casing having a securing flange 12 that is received by a holding bead 13, the latter being formed preferably of cocoanut fiber. Engaged with the holding bead 13 is a plurality of substantially L-shaped fastening clips 14, one end of each of these clips being seated upon the holding bead, while the other end is secured to the stock 1 through the medium of a screw 15. It will thus be seen that the plumb-bob 3 is shielded by the casing 11, but fully exposed thereby, and free to vibrate upon the stock 1 as the latter is shifted to various positions.

The stock 1 is provided with a plurality of holding clamps 16. While the drawings disclose two of these, it is obvious that any number may be employed, the purpose of these clamps being to secure the stock 1 upon the jamb of a door so that the level may remain temporarily thereon, or until the jamb has been fully set. Each of these holding clamps comprises a slide 17, the outer or free end of which is provided with an engaging foot 18, the inner face of which is fluted or serrated, and by thus roughening the inner face of the foot 18, the latter will tightly engage the jamb of the door, and be free from slipping thereon. The edges of the slide 17 are slightly beveled, and said slide is received by a keeper 19 having a longitudinally extending slot for said slide. The edges of this slot are also beveled, as clearly seen in Fig. 6, to correspond with the beveled side edges of the slide 17, and in order that the latter may freely move in the keeper 19 guides 20 are associated therewith. The keeper 19 has also associated with it, and projecting at substantially right angles thereto, a supporting foot 21, and carried by said supporting foot 21 is a socket 22 for receiving one end of an adjusting screw 23. This end of said screw 23 is provided with an annular groove 24, and seated in said groove is the end of a retaining screw 25 that is carried by the socket 22. Thus, while the screw 23 is capable of rotation, said screw is held against displacement from the socket 22, and consequently has a fixed relation in said socket and to the supporting foot 21. Threadably mounted upon the screw 23 is an adjusting block 26, which block projects through a transversely extending slot 27 that is formed in the stock 1, and which registers with the slot of the keeper 19. The slide 17 is connected to the adjusting block 26, as by screws 28, and hence said slide moves in the slot of the keeper in accordance with the adjustment of the block 26 by means of the screw 23. The block 26 works upon a wear plate 29, which plate is arranged over the slot 27 of the stock 1. It will thus be seen that in accordance with the movement of the block 26 the engaging foot 18 of the slide 17 is moved in relation to that edge of the stock 1 at which said foot projects, and when moved a sufficient distance therefrom the space between said foot and the contiguous edge of stock 1 will receive the jamb of the door, as indicated by dotted lines in Fig. 4. By means of the screws 28 the slide 17 is detachably connected to the adjusting block 26, and this enables different lengths of the slide 17 to be applied to said block.

In the use of the level merely for the purpose of setting door jambs, it is unnecessary for large spaces to be formed between the engaging feet 18 and the contiguous edge of the stock 1, but inasmuch as the level is adapted for general uses, there are conditions under which it is necessary for a greater latitude of movement. This is especially so when the level is employed by brick layers, in which event it is necessary for the slide 17 to have a greater range of movement, and to provide for this the invention contemplates the provision of supplemental slides. One of these is held in a keeper 30 that is located in proximity to each of the holding clamps 16, and when it is necessary to use these supplemental slides the same are removed from their keepers and substituted for the shorter slides, the latter, in turn, being placed in the keepers 30 and held therein for subsequent use. To prevent displacement of the slides from the keepers 30, fastening screws 31 are employed.

At the rear face of the stock 1, and adjacent to its upper end, one of the edges is provided with a rabbeted or cut out portion 32, and pivoted in the upper end thereof is a gage arm 33. The function of this arm is to serve for determining the correct position of the transverse frame member, whether the latter be the head jamb or the transom rail. To this end the gage arm 33 is projected at right angles to the stock 1, being swung upon its pivot in order to occupy this position, and that the same may be held therein a supporting arm 34 is employed. This arm is pivotally connected, as at 35, to the free end of the gage arm 33, said supporting arm being provided with an elongated slot 36, and seated within said slot 36 is a clamping screw 37. The latter is carried by the stock 1, and is arranged in a pocket 38 which opens at the edge of the stock 1 in which the rabbeted or cut out portion 32 is formed. The pocket 38 bears such an angular relation to the stock 1 that when the lower end of the supporting arm 34 is seated therein, as clearly shown in Fig. 2, the gage arm 33 will be exactly at right angles to the stock 1, and it will thus be seen that the supporting arm 34 constitutes the hypotenuse of a right angle triangle the angle of which is formed by the gage arm 33 and the stock 1. The screw 37 is received by a bushing 39 that is countersunk in the stock 1, a thumb screw 40 being carried by said screw for effecting the clamping action upon the slide 34. This is clearly shown in Fig. 9. The gage arm 33 is pivoted to the stock 1 by a screw 41 of a construction similar to the screw 37, and when it is desired to fold the gage arm 33 into closed position the screws 37 and 41 are loosened, the lower end of the supporting arm 34 is removed from the pocket 38, and the gage arm 33 swung into the rabbeted or cut away portion 32, in which position the supporting arm 34 occupies a position lengthwise of the stock 1, as shown by dotted lines in Fig. 2. In this position the arms 33 and 34 are clamped by tightening the screws 37 and 41.

Under certain conditions it is necessary that provision be made for lengthening the stock 1, that the latter may be employed at certain points of the door jamb with the top of the stock 1 removed from the top of the door. This is especially true in adjusting the position of the transom rail, and to this end the stock 1 has mounted thereon an adjustable slide 42. The inner face of this slide is provided with a dove-tailed groove 43 which receives the dove-tailed head 44 of a clamping bolt 45 provided with a thumb nut 46. The slide 42 is positioned immediately contiguous to that edge of the stock 1, and flush with the same, at which the holding clamps 16 are located. In this position, when the slide 42 is projected beyond the upper end of the stock 1, said slide forms a continuation of the edge of the stock referred to. At a point adjacent to the lower end of the slide 42 a dove-tailed projection 46 is arranged, which projection slides within a dove-tailed groove 47 formed in a guide plate 48 that extends longitudinally of the stock 1. By means of the head 44 of the bolt 45 and the projection 46 and guide plate 48, the slide 42 is held upon the stock 1, and freely movable thereon, and when not required for use the same is so adjusted upon the stock as not to project above the upper end thereof.

In the use of the herein described plumb level the slides 17 of the holding clamps 16 are suitably adjusted in order to receive the jamb of the door prior to setting the same. When positioned upon the jamb the holding clamps are tightened sufficiently to bring the engaging feet 18 into such frictional contact therewith as to prevent slipping of the stock 1 upon the jamb. As the latter is brought to the proper position, the plumb-bob 3 swings upon the stock 1 until the position of the jamb is such that the cord 4 is over the guide lines 9, and when the cord hangs in this position, it is obvious that the jamb is perfectly vertical. The movement of the cord is visible from both sides of the stock 1, the glass 7 permitting observation from the rear side of the stock. For determining the accuracy of adjustment or positioning of the head jamb or transom rail, the gage arm 33 is swung out to right angles to the stock 1, and held therein by seating the lower end of the supporting arm 34 in the pocket 38, as previously described, and with the gage arm 33 in this position, and the line 4 hanging perfectly vertical upon the stock 1, the user of the level can position the transom rail or the head jamb exactly at right angles to the side jamb.

It will thus be seen that the hereindescribed invention provides a plumb level that permits its application to the door jamb and remains thereon until the jamb has been correctly set, the holding clamps 16 permitting this temporary fixing of the level upon the jamb, and overcoming the necessity for repeated application to the jamb as the latter is brought through various stages to its correct position. This saves constant application of the leveling instrument, and repeated observation each time it is applied, as is now the case with plumb levels of ordinary construction, and hence it is possible by the employment of the present invention to more expeditiously set a jamb than by the employment of the ordinary levels.

Having thus described the invention, what is claimed as new, and desired to be secured by Letters Patent, is:

1. A plumb level, comprising a stock, means associated therewith for indicating its level position, adjustable slides associated with said stock for clamping the latter to the object to be leveled, and screws for adjusting said slides.

2. A plumb level, comprising a stock, means associated therewith for indicating its level position, adjustable slides associated with said stock and provided with engaging feet for clamping the stock to the object to be leveled, keepers for said slides, supporting feet associated with said keepers, and adjustable screws carried by said supporting feet and connected to said slides for adjusting the latter.

3. A plumb level, comprising a stock, means associated therewith for indicating its level position, adjustable slides associated with said stock for clamping the latter to the object to be leveled, keepers for said slides, actuating devices for adjusting said slides and with which the latter are detachably connected, supplemental slides carried by said stock and interchangeable with the slides carried by said actuating devices, and keepers for said supplemental slides.

4. A plumb level, comprising a stock, means associated therewith for indicating its level position, a gage arm pivotally connected to said stock and adapted to be projected at right angles thereto, and a supporting arm pivotally connected to said gage arm and adjustable upon the stock for holding the supporting arm in adjusted position, said stock having a pocket for receiving the supporting arm to hold the latter in such relation to the stock as to maintain the gage arm exactly at right angles to the stock.

5. A plumb level comprising a stock having a plumb-bob and line thereon, slides arranged to project from the stock transversely to the normal position of the line, said slides being adapted to grasp an element between the slides and the edge of the stock, and means for adjustably securing the slides to the stock.

6. A plumb level comprising a stock having a line and plumb-bob thereon, slides arranged to project from the stock transversely to the normal position of the line and adapted to clasp an element between the slides and the edge of the stock, and screws connecting the stock and the slides to adjust the slides and secure them in their adjusted positions.

7. A plumb level comprising a stock having a plumb-bob and line thereon, a series of supporting feet secured to one end of the stock, the stock being provided with slots, each slot being adjacent to a supporting foot, an adjustable block projecting through each slot, a slide on each block, each slide having an engaging foot, each engaging foot being adapted to coöperate with a supporting foot to clasp an element and screws, each screw being in operative engagement with an adjustable block and with a supporting foot to adjust and secure the engaging foot and its slide.

8. A plumb level comprising a stock having a plumb-bob and line thereon, a series of supporting feet secured to one end of the stock, the stock being provided with slots, each slot being adjacent to a supporting foot, an adjustable block projecting through each slot, a slide on each block, each slide having an engaging foot, each engaging foot being adapted to coöperate with a supporting foot to clasp an element, screws, each screw having one end rotatably secured to a supporting foot and being in screw-threaded engagement with one of the adjustable blocks, and means on the projecting end of the screw to provide for its manual manipulation.

9. A plumb level comprising a stock having a plumb-bob and line thereon and having one of its edges rabbeted, a gage arm pivotally secured at one end in one end of the rabbeted portion, a supporting arm pivotally engaged at its outer end to the outer end of the gage arm, the supporting arm being slotted, and a screw passing through the slot in the supporting arm and secured to the stock for adjustably securing the supporting arm to the stock, the stock having a pocket in which the end of the supporting arm is adapted to be fitted when the supporting arm has projected far enough to cause the gage arm to project at right-angles to the stock.

10. A plumb level comprising a stock having a plumb-bob and line thereon and having one of its edges rabbeted, a gage arm pivotally secured at one end in one end of the rabbeted portion, a supporting arm pivotally engaged at its outer end to the outer end of the gage arm, the supporting arm being slotted, a screw passing through the slot in the supporting arm and secured to the stock for adjustably securing the supporting arm to the stock, the stock having a pocket in which the end of the supporting arm is adapted to be fitted when the supporting arm has projected far enough to cause the gage arm to project at right angles to the stock, adjustable slides projecting from the stock at right-angles to the normal position of the line, and means for adjustably securing the slides to the stock, the slides being adapted to grasp an element between the slides and the edge of the stock.

11. A plumb level comprising a stock having a plumb-bob and line thereon and having a longitudinally arranged dove-tailed groove in one of its faces, a slide, a dove-tailed projection on the inner end of the slide and adapted to fit in the dove-tailed groove in the stock, the slide having a dove-tailed groove on its face adjacent to the stock, a bolt having a dove-tailed head to fit the dove-tailed groove of the slide, the bolt projecting through the stock, and a thumb-nut on the bolt.

12. A plumb level comprising a stock having a plumb-bob and line thereon and having a longitudinally arranged dove-tailed groove in one of its faces, a slide, a dove-tailed projection on the inner end of the slide and adapted to fit in the dove-tailed groove in the stock, the slide having a dove-tailed groove on its face adjacent to the stock, a bolt having a dove-tailed head to fit the dove-tailed groove of the slide, the bolt projecting through the stock, a thumb-nut on the bolt, adjustable slides adapted to move transversely to the normal position of the line and arranged to grasp an element between the slides and the edge of the stock, and means for adjustably securing the slides on the stock.

In testimony whereof I affix my signature, in the presence of two witnesses.

JOHN C. HANSEN, Jr.

Witnesses:
ADOLPH F. MARQUIER,
FRED. W. GEIMER.